United States Patent [19]

Futatsuishi et al.

[11] Patent Number: 4,782,615
[45] Date of Patent: Nov. 8, 1988

[54] ADVERTISING BOARD FOR MOBILE DISPLAY SYSTEM

[75] Inventors: Shunichi Futatsuishi; Shozo Fujita, both of Nagasaki, Japan

[73] Assignee: Mitsubishi Denki Kabushiki Kaisha, Tokyo, Japan

[21] Appl. No.: 572,980

[22] Filed: Jan. 25, 1984

Related U.S. Application Data

[63] Continuation of Ser. No. 353,275, Mar. 1, 1982, abandoned.

[30] Foreign Application Priority Data

Mar. 11, 1981 [JP] Japan ................................. 56-34721

[51] Int. Cl.⁴ ............................................. G09F 21/04
[52] U.S. Cl. ......................................... 40/591; 40/530; 40/524
[58] Field of Search ........................... 40/591, 584, 622

[56] References Cited

U.S. PATENT DOCUMENTS

| Re. 29,006 | 10/1976 | Coleman | 40/588 |
|---|---|---|---|
| 1,189,676 | 7/1916 | Fairbanks | 40/591 |
| 1,597,262 | 8/1926 | Bloodgood | 40/591 |
| 3,782,766 | 1/1974 | Teel | 40/591 |

Primary Examiner—Gene Mancene
Assistant Examiner—Wenceslao J. Contreras
Attorney, Agent, or Firm—Sughrue, Mion, Zinn, Macpeak & Seas

[57] ABSTRACT

An advertising board for use with a mobile display system is arranged in parts surrounding the display board of the system. For transport, the advertising board is collapsible in a "nested" fashion such that a plurality of boards are arranged parallel to and adjacent each other. The top board may be simply pivoted relative to the other boards so as to fold over the top thereof.

9 Claims, 2 Drawing Sheets

ADVERTISING BOARD FOR MOBILE DISPLAY SYSTEM

This application is a continuation of application Ser. No. 353,275, filed 3-1-82, now abandoned.

BACKGROUND OF THE INVENTION

This invention relates to the construction of an advertising board for a mobile diaplay system.

In a mobile display system for displaying information on a vehicle mounted display board for simultaneous viewing by a number of persons, it is necessary to raise the display board to a predetermined height so that all persons can clearly see it, and then to lower the display board before the vehicle is moved to another place. For this purpose, a lift is mounted on the vehicle, to move the display board vertically at the display site. During the display, the exposure of the lift and its control means to the audience is unattractive. Therefore, flat boards may be set around the display board in such a manner as to cover the lift and the control means. The flat boards are used as advertisement means, namely, an advertising board.

A set of such flat boards is referred to an advertizing board for a mobile display system. At the display site, the flat boards are set around the display board, which is raised to a suitable level. Before the vehicle is moved to another place, the flat boards are removed from the display board and loaded thereon. Heretofore, the assembling and disassembling of the flat boards have been manually carried out, requiring a large amount of time and labor.

U.S. Pat. No. 4,110,792 to Long et al discloses a vehicle mounted display apparatus having a trio of hinged panels which are folded one over the other for transport, and which may be pivotted into a flat shape for use. The panels are supported by a partially collapsible frame structure, so that the panels are rotated through 90° from the transport to the display position. Such a system is disadvantageous in that there is insufficient structural stability of the system, and the load is highly variable during erection of the display. Also, the lift and control mechanism are visible during display, resulting in the disadvantage noted above.

SUMMARY OF THE INVENTION

An object of this invention is to eliminate the above-described difficulty accompanying a conventional advertizing board for a mobile display system. More specifically, an object of this invention is to provide an advertizing board for a mobile display system, which, according to the invention, is divided into a plurality of parts which can be mechanically assembled and disassembled with ease using power operated means for moving the various parts.

DETAILED DESCRIPTION OF THE PREFERRED EMBODIMENTS

Figure 1:
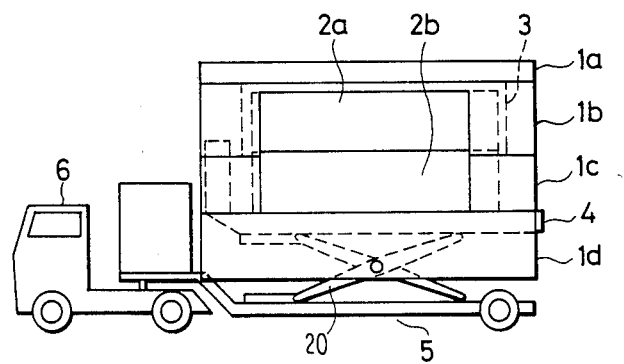
FIG. 1 is a front view of one embodiment of the invention.
Figure 2:
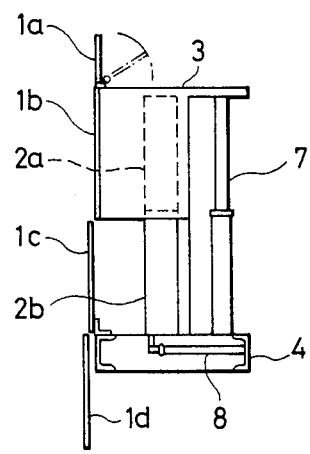
FIGS. 2, 3 and 4 are explanatory diagrams illustrating several of the details of the construction and operation thereof.
Figure 3:
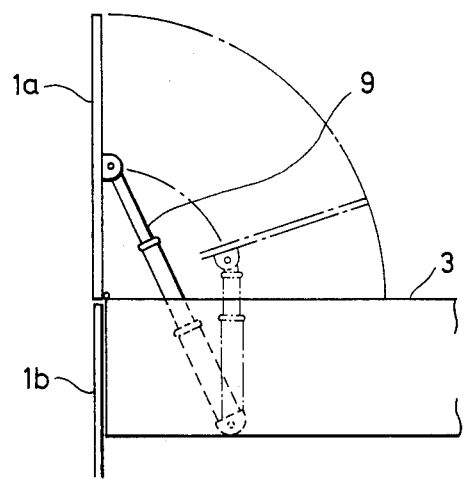
Figure 4:
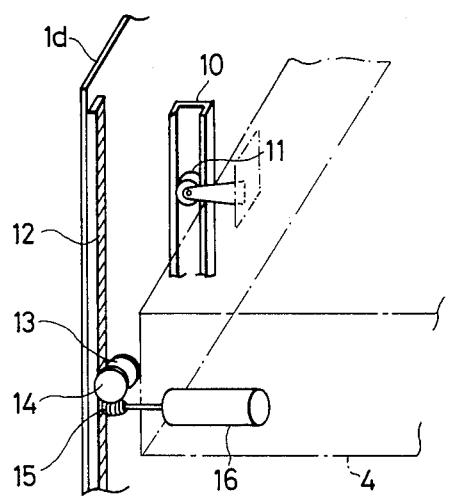

FIG. 1 is a front view showing one embodiment of this invention, and FIGS. 2, 3 and 4 are explanatory diagrams of several parts thereof, where like parts are designated by like reference numerals or characters. In the figures, reference characters $1a$, $1b$, $1c$ and $1d$ designate flat boards forming an advertising board; $2a$ and $2b$ are display boards forming a display section; 3 is a support structure; 4, a stand; 5, a chassis; 6, a tractor; 7, a lift for raising and lowering support 3; 8, a slider for moving display board $2b$ laterally; 9, a cylinder; 10, a guide; 11, a roller; 12 and 13, a rack and pinion, respectively; 14 and 15, reduction gears; and 16, an electric motor.

The advertising board 1 is obtained by assembling the flat boards $1a$ through $1d$ as shown in FIGS. 1 and 2, the display section 2 being obtained by arranging the display boards $2a$ and $2b$ as shown in FIG. 1. Thus, the main advertisement or message would be located on the boards $2a$ and $2b$ with the boards' $1a$–$1d$ forming a frame which hides the operating mechanisms as viewed in FIG. 1.

FIG. 1 is a front view of the advertising board, and FIG. 2 is a side view showing a part of the advertising board. The advertising board shown in FIGS. 1 and 2 is in the display state, i.e., the flat boards $1a$ and $1b$ are in a common vertical plane as best seen in FIGS. 2 and 3, and the flat boards $1b$, $1c$ and $1d$ are installed in parallel vertical planes which are off-set from one another horizontally by as much as the thickness of the board, respectively as best seen in FIG. 2. The support structure 3 is mounted on the stand 4, and can be moved up and down by a hydraulic lift 7. The flat board $1b$ having a cut-out portion for receiving board $2a$ is fixedly secured to the support 3 along with board $2a$, and thus the board $1b$ and the display board $2a$ can be moved vertically by the lift hydraulic 7. The flat board $1a$ is pivoted at its lower edge on the structure 3, and can be turned through 90° about its lower edge as indicated in FIG. 2 and FIG. 3. The flat board $1c$ having a cut out for viewing board 26 is fixedly secured to the stand 4 which can be raised and lowered on the chassis 5 of the trailer by any suitable power operated means such as the scissor jack 20 shown in FIG. 1.

As shown in FIG. 2, the display board $2b$ is located directly below the display board $1a$ in the display position so that the faces thereof viewed in FIG. 1 will be in a common plane. The lower display board $2b$ is slidably mounted on the upper surface of the stand 4 and may be shifted to the left as viewed in FIG. 2 by means of the hydraulic mechanism 8 connected thereto to move the display board $2b$ out from under the display board $2a$. This will allow the display board $2a$ which is connected to support 3 to be lowered by the hydraulic lift 7 into the transport position.

The flat board $1d$ is vertically moveable relative to the flat board $1c$ by means of the rack 12 and pinion gear 13, the vertically driving motor 16 and reduction gears 14 and 15, as seen in the perspective view of FIG. 4. The flat board $1d$ is not secured directly to the stand 4, and therefore, a plurality of guides 10 are fixedly secured to the flat board $1d$ and a plurality of rollers 11 are fixedly secured to the stand 4 so that the flat board $1d$ will not be shifted horizontally while being moved upwardly or downwardly relative to board $1c$.

Thus, to set up the display the stand 4 is raised above the chassis 5 to the position shown in FIG. 1 by means of the scissors-type jack 20. The support 3 is then raised above the stand 4 by means of the hydraulic lift 7 to the position shown in FIGS. 1 and 2. The board $1a$ is then pivoted from the horizontal position on the upper surface of the support 3 to the vertical position shown in FIGS. 1–3 by means of the hydraulic cylinder 9. Next the motor 16 is operated to lower the board 1d from a position in front of the board 1c to the position shown in FIGS. 1 and 2 in order to substantially cover the scissors-type jack 20. Finally, the display board 2b is moved by the hydraulic mechanism 8 to a position directly under board 2a as shown in FIG. 2.

In the above-described embodiment, an electric motor 16 is used; however, it may be replaced by a drive which operates in association with the hydraulic system.

As is clear from the above description, the boards forming the advertising board are arranged relative to their respective supports so that the boards may be automatically erected and collapsed. The board advertising is designed so as to be able to withstand vibration or wind pressure while being transported or after it has been erected at the site of display.

All of the flat boards 1a, 1b, 1c and 1d can be defined as cover boards adapted to hide various operating mechanisms while defining a frame about the display boards 2a and 2b.

What is claimed is:

1. An advertising display board for a mobile display system adapted to be mounted on the chassis of a vehicle comprising a stand adapted to be mounted for vertical movement on the chassis of a vehicle, means for moving said stand vertically relative to said chassis, a first vertically disposed display board carried by said stand, a support member mounted on said stand for vertical movement relative thereto, means for moving said support member vertically relative to said stand, and a second display board carried by said support member whereby upon lowering of said support member, said second display board will be disposed at the same level as said first display board for transport and upon raising said support member said second display board will be disposed above said first display board to define an enlarged display surface.

2. An advertising display board as set forth in claim 1 further comprising means for moving said first display board laterally relative to said stand between a transport position laterally offset from said second display board and a display position disposed directly beneath said second display board when said second display board is in the raised position.

3. An advertising display board as set forth in claim 1 further comprising a first flat vertically disposed cover board secured to said support member parallel to said second display board and having an opening through which said second display board may be viewed.

4. An advertising display board as set forth in claim 3 further comprising a second flat cover board pivotally mounted on said support member adjacent said first flat cover member for movement between a first horizontal transport position and a second vertical display position in vertical alignment with said first flat cover board and means for moving said second flat cover board between said first and second positions.

5. An advertising display board as set forth in claim 4 further comprising a third flat vertically disposed cover board secured to said stand adjacent said first flat cover board but laterally offset relative thereto to allow said first flat cover board to move vertically relative to said third flat cover board upon vertical movement of said support member, said third flat cover member having an opening for viewing said first display board.

6. An advertising display board as set forth in claim 5 further comprising a fourth flat vertically disposed cover board mounted for vertical movement on said stand between a first position in horizontal alignment with said third flat cover member and a second position below said third flat cover member and means for moving said fourth flat cover member between said first and second positions.

7. An advertising display board for a mobile display system adapted to be mounted on the chassis of a vehicle comprising a stand adapted to be mounted for vertical movement on the chassis of a vehicle, means for moving said stand vertically relative to said chassis, a first vertically disposed display board carried by said stand, a support member mounted on said stand for vertical movement thereto, means for moving said support member vertically relative to said stand, a second display board carried by said support member whereby upon lowering of said support member, said second display board will be disposed at the same level as said display board for transport and upon raising said support member, said second display board will be disposed above said first display board to define an enlarged display surface, means for moving said first display board laterally relative to said stand between a transport position laterally offset from said second display board and a display position disposed directly beneath said second display board when said second display board is in the raised position, a first flat vertically disposed cover board secured to said support member parallel to said second display board and having an opening through which said second display board may be viewed, a second flat cover board pivotally mounted on said support member adjacent said first flat cover member for movement between a first horizontal transport position and a second vertical display position in vertical alignment with said first flat cover board, means for moving said second flat cover board between said first and second positions, a third flat vertically disposed cover board secured to said stand adjacent said first flat cover board, but laterally offset relative thereto to allow said first flat cover board to move vertically relative to said third flat cover board upon vertical movement of said support member, said third flat cover member having an opening for viewing said first display board, a fourth flat vertically disposed cover board mounted for vertical movement on said stand between a first position in horizontal alignment with said third flat cover member and a second position below said third flat cover member and means for moving said fourth flat cover member between said first and second positions.

8. An advertising display board for a mobile display system adapted to be mounted on the chassis of a vehicle comprising a stand adapted to be mounted for vertical movement on the chassis of a vehicle, means for moving said stand vertically relative to said chassis, a first vertically disposed display board carried by said stand, a support member mounted on said stand for vertical movement relative thereto, means for moving said support member vertically relative to said stand, a second display board carried by said support member whereby upon lowering of said support member, said second display board will be disposed at the same level as said display board for transport and upon raising said support member, said second display board will be disposed above said first display board to define an enlarged display surface, means for moving said first display board laterally relative to said stand between a transport position laterally offset from said second display board and a display position disposed directly beneath said second display board when said second display board is in the raised position, a first flat vertically disposed cover board secured to said support member parallel to said second display board and having an opening through which said second display board may be viewed, a second flat cover board pivotally mounted on said support member adjacent said first flat cover member for movement between a first horizontal transport position and a second vertical display position in vertical alignment with said first flat cover board, means for moving said second flat cover board between said first and second positions, a third flat vertically disposed cover board mounted for vertical movement on said stand between a first position in horizontal alignment with said first display board and a second position below said first display board and means for moving said third flat cover member between said first and second positions.

9. An advertising display board for a mobile display system as set forth in claim 8, further comprising a fourth flat vertically disposed cover board secured to said stand adjacent said first flat cover board, but laterally offset relative thereto to allow said first flat cover board to move vertically relative to said fourth flat cover board upon vertical movement of said support member, said fourth flat cover member having an opening for viewing said first display board.

* * * * *